(12) United States Patent
Jiang et al.

(10) Patent No.: US 11,301,278 B2
(45) Date of Patent: Apr. 12, 2022

(54) PACKET HANDLING BASED ON MULTIPROCESSOR ARCHITECTURE CONFIGURATION

(71) Applicant: VMware, Inc., Palo Alto, CA (US)

(72) Inventors: Jingchun Jiang, Beijing (CN); Donghai Han, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 31 days.

(21) Appl. No.: 15/961,900

(22) Filed: Apr. 25, 2018

(65) Prior Publication Data

US 2019/0332408 A1  Oct. 31, 2019

(51) Int. Cl.
*G06F 9/455* (2018.01)
*H04L 29/06* (2006.01)
*H04L 69/22* (2022.01)

(52) U.S. Cl.
CPC .......... *G06F 9/45558* (2013.01); *H04L 69/22* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 8,493,839 | B2 | 7/2013 | Cripe et al. |
| 8,861,525 | B1* | 10/2014 | Durand ................. H04L 61/251 |
| | | | 370/392 |
| 9,986,025 | B2 | 5/2018 | Jiang et al. |
| 2002/0080720 | A1* | 6/2002 | Pegrum ................... H04L 47/10 |
| | | | 370/236 |
| 2007/0002738 | A1 | 1/2007 | McGee |
| 2008/0043617 | A1 | 2/2008 | Schekochikhin et al. |
| 2009/0292858 | A1* | 11/2009 | Lambeth ........... H04L 29/12839 |
| | | | 711/6 |
| 2010/0077409 | A1 | 3/2010 | Hernandez et al. |
| 2010/0131636 | A1 | 5/2010 | Suri et al. |
| 2011/0090912 | A1 | 4/2011 | Shippy |
| 2011/0153840 | A1 | 6/2011 | Narayana et al. |
| 2014/0036665 | A1 | 2/2014 | Chowdhury et al. |
| 2015/0207754 | A1 | 7/2015 | Johnson |
| 2015/0281274 | A1* | 10/2015 | Masurekar .......... G06F 9/45558 |
| | | | 726/22 |
| 2016/0048402 | A1* | 2/2016 | Tsirkin ................. H04L 45/7453 |
| | | | 718/1 |
| 2016/0094318 | A1 | 3/2016 | Shattil |

(Continued)

*Primary Examiner* — Wynuel S Aquino
(74) *Attorney, Agent, or Firm* — Su IP Consulting

(57) ABSTRACT

Example methods are provided for a host to perform packet handling based on a microprocessor architecture configuration that includes a first node and a second node. One example method may comprise detecting, from a virtualized computing instance supported by the host, an egress packet for transmission to a destination via one of multiple physical network interface controllers (PNICs) of the host. The method may also comprise: identifying the first node assigned to the virtualized computing instance and selecting a first PNIC associated with the first node assigned to the virtualized computing instance. The multiple PNICs may include the first PNIC, and a second PNIC associated with the second node. The method may further comprise sending the egress packet to the destination via the first PNIC associated with the first node.

15 Claims, 5 Drawing Sheets

(56) References Cited

U.S. PATENT DOCUMENTS

| | | |
|---|---|---|
| 2016/0164787 A1 | 6/2016 | Roach et al. |
| 2016/0164956 A1 | 6/2016 | Hopen et al. |
| 2016/0197836 A1 | 7/2016 | Hussain et al. |
| 2017/0142194 A1 | 5/2017 | Bolshakov |
| 2017/0289036 A1* | 10/2017 | Vasudevan .............. H04L 49/70 |
| 2017/0317932 A1 | 11/2017 | Paramasivam |
| 2018/0307520 A1* | 10/2018 | Hyoudou .............. G06F 9/4856 |
| 2019/0297013 A1* | 9/2019 | Xin ........................ H04L 45/74 |

* cited by examiner

PACKET HANDLING BASED ON MULTIPROCESSOR ARCHITECTURE CONFIGURATION

CROSS-REFERENCE TO RELATED APPLICATION

The present application is related in subject matter to U.S. patent application Ser. No. 15/162,628.

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. In practice, a host may utilize multiple physical network interface controllers (PNICs) to receive and send traffic to and from virtual machines supported by the host. However, existing approaches for PNIC selection during packet handling may not be suitable or sub-optimal for the underlying multiprocessor architecture of the host, such as a non-uniform memory access (NUMA) architecture where memory access time of a processor depends on the memory location relative to the processor.

DETAILED DESCRIPTION

Figure 1:
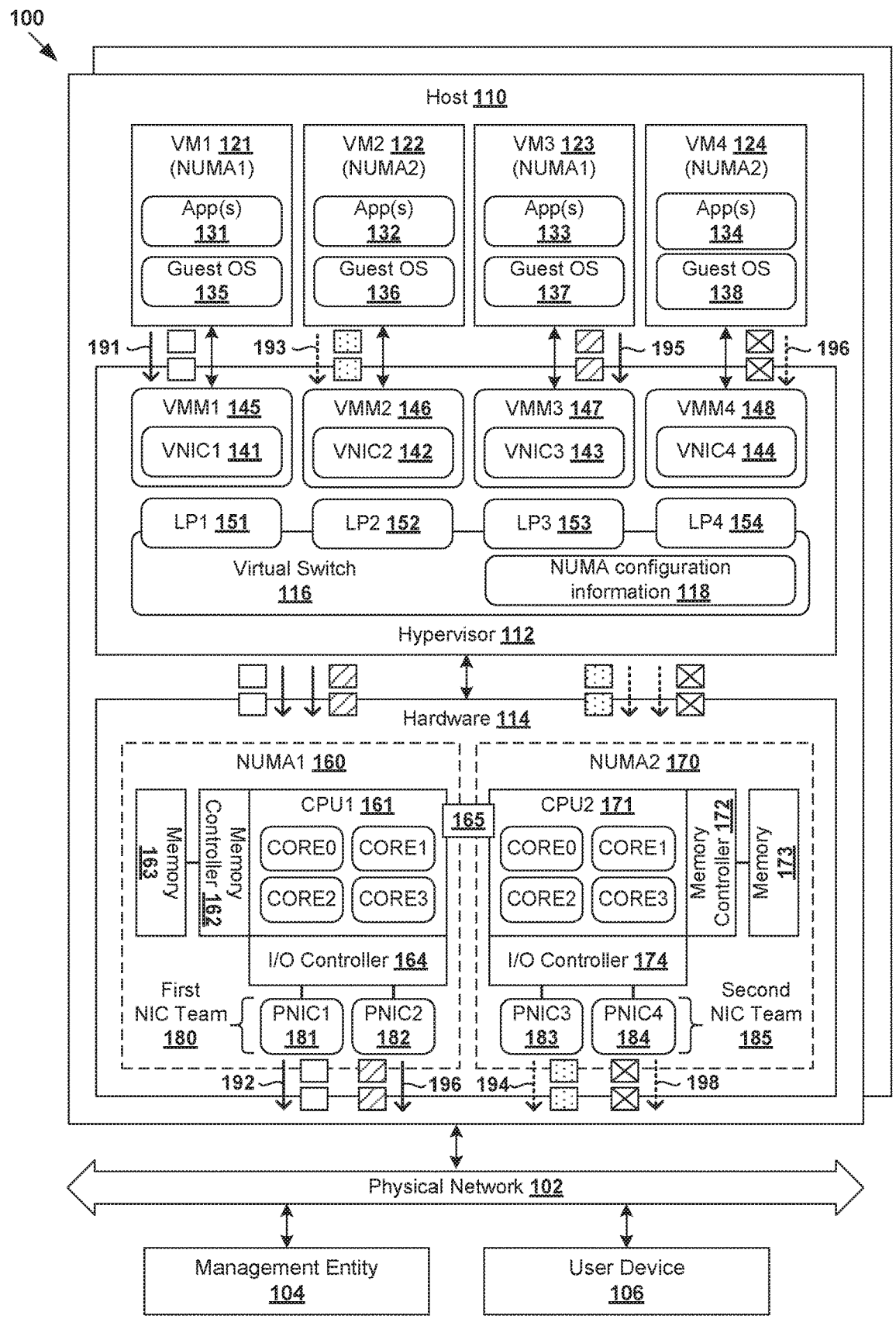
FIG. 1 is a schematic diagram illustrating an example virtualized computing environment in which packet handling based on NUMA configuration may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to packet handling at a host with multiple physical network interface controllers (PNICs) will now be explained in more detail using FIG. 1. In particular, FIG. 1 is a schematic diagram illustrating example virtualized computing environment 100 in which packet handling based on non-uniform memory access (NUMA) configuration may be performed. It should be understood that, depending on the desired implementation, virtualized computing environment 100 may include additional and/or alternative components than that shown in FIG. 1.

In the example in FIG. 1, virtualized computing environment 100 includes multiple hosts 110 (one shown in detail for simplicity; also known as "computer systems", "host computers", "host devices", "physical servers", "server systems", etc.) that are connected to physical network 102. Each host 110 includes suitable virtualization software (e.g., hypervisor 112) and hardware 114 to support virtual machines (VMs), such as VM1 121, VM2 122, VM3 123 and VM4 124. Although one host 110 and four VMs 121-124 are shown for simplicity, there may be multiple hosts in virtualized computing environment 100, each supporting tens or hundreds of virtual machines in practice.

Each host 110 is connected with management entity 104 via physical network 102. Management entity 104 provides management functionalities to manage various objects, such as hosts 110, VMs 121-124, etc. In practice, management entity 104 may be implemented by one or more virtual or physical entities. Users (e.g., network administrators) operating respective user devices 106 may access the functionalities of management entity 104 via any suitable interface, such as graphical user interface, command-line interface, Application Programming Interface (API) calls. User device 106 may be any suitable computer system, such as user workstation, client device, mobile device, etc.

Hypervisor 112 maintains a mapping between underlying hardware 114 of host 110 and virtual resources allocated to respective VMs 121-124. Virtual resources are allocated to VMs 121-124 to support respective applications 131-134 and guest operating systems (OS) 135-138, etc. For example, the virtual resources may include virtual CPU, guest physical memory (i.e., memory visible to the guest OS running in a VM), virtual disk(s), virtual network interface controller (VNIC), etc. Virtual machine monitors (VMMs) 145-148 are implemented by hypervisor 112 to emulate hardware resources for VMs 121-124. For example, VMM1 145 is configured to emulate VNIC1 141 to provide network access for VM1 121, VMM2 146 to emulate VNIC2 142 for VM2 122, VMM3 147 to emulate VNIC3 143 for VM3 123, and VMM4 148 to emulate VNIC4 144 for VM4 124. In practice, VMMs 145-148 may be considered as components that are part of respective VMs 121-124, or alternatively, separated from VMs 121-124. In both cases, VMMs 145-148 each maintain the state of respective VNICs 141-144 to facilitate migration of respective VMs 121-124.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc. Hypervisor 112 may be implemented any suitable virtualization technology, such as VMware ESX® or ESXi™ (available from VMware, Inc.), Kernel-based Virtual Machine (KVM), etc.

Hypervisor 112 further implements virtual switch 116 to handle traffic forwarding to and from VMs 121-124. For example, VMs 121-124 may send egress (i.e., outgoing) packets and receive ingress packets (i.e., incoming) via respective VNICs 141-144 and logical ports 151-154 during a communication session with another node (e.g., virtual machine, physical host, etc.) connected via physical network 102. In this case, VMs 121-124 may each act as an endpoint of a bi-directional inter-process communication flow with another endpoint. For example, an endpoint may be capable of creating a socket to facilitate the communication flow, such as Transmission Control Protocol (TCP) sockets, raw Internet Protocol (IP) sockets, etc. The destination node may be an external host, virtual machine supported by the external host, etc.

As used herein, the term "logical port" may refer generally to a port on a logical switch to which a virtualized computing instance is connected. A "logical switch" may refer generally to an SDN construct that is collectively implemented by multiple virtual switches, whereas a "virtual switch" may refer generally to a software switch or software implementation of a physical switch. In practice, there is usually a one-to-one mapping between a logical port on a logical switch and a virtual port on virtual switch 116. However, the mapping may change in some scenarios, such as when the logical port is mapped to a different virtual port on a different virtual switch after migration of the corresponding virtualized computing instance (e.g., when the source and destination hosts do not have a distributed virtual switch spanning them). As used herein, the term "packets" may refer generally to a group of bits that can be transported together from a source to a destination, such as "segments," "frames," "messages," "datagrams," etc. Physical network 102 may be any suitable network, such as wide area network, virtual private network (VPN), etc.

Host 110 may be configured according to any suitable multiprocessor architecture, such as non-uniform memory access (NUMA) architecture, etc. For example, NUMA systems are advanced system platforms with more than one system bus and can generally harness a large number of processors in a single system image with superior price to performance ratios. In recent years, processor clock speed has increased dramatically. A multi-gigahertz CPU, however, needs to be supplied with a large amount of memory bandwidth to use its processing power effectively. Even a single CPU running a memory-intensive workload (e.g., a scientific computing application) may be constrained by memory bandwidth. This problem generally is amplified on symmetric multiprocessing (SMP) systems, where many processors must compete for bandwidth on the same system bus. Some high-end systems often try to solve this problem by building a high-speed data bus, but this solution is expensive and limited in scalability.

NUMA is an alternative approach that links several smaller, more cost-effective nodes (called "NUMA nodes") using a high-performance NUMA connection. The term "NUMA node" may refer generally to a group of processor(s) and memory configured using any suitable NUMA-based architecture, including cache-coherent NUMA (ccNUMA), etc. An advanced memory controller allows a node to use memory on all other nodes, creating a single system image. When a processor accesses (remote) memory that does not lie within its own NUMA node, the data must be transferred over the NUMA connection, which is slower than accessing local memory. Memory access times are therefore "not uniform" and depend on the location of the memory and the node from which it is accessed.

In the example in FIG. 1, host 110 includes multiple NUMA nodes, such as first NUMA node 160 ("NUMA1") and second NUMA node 170 ("NUMA2") that are interconnected via NUMA connection 165. Each NUMA node 160/170 includes multi-core CPU 161/171, memory controller 162/172, host physical memory 163/173, Input/Output (I/O) controller 164/174, etc. As used herein, the term "local memory" may refer generally to the memory that is on the same node as a CPU, and the term "remote memory" to the memory that is on a different node. For example, first CPU 161 (labelled "CPU1") may access its local memory 163 on the same on NUMA1 160 faster than remote memory 173 on different NUMA2 170. Similarly, second CPU 171 (labelled "CPU2") on NUMA2 170 may access its local memory 173 faster than remote memory 163 on NUMA1 160. The shared memory functionality is provided by via NUMA connection 165.

Depending on the desired implementation, host 110 (e.g., using an entity called NUMA scheduler) may assign each VM to a "home node" to improve performance. In the example in FIG. 1, VM1 121 and VM3 123 are assigned to NUMA1 160, and VM2 122 and VM4 124 to NUMA2 170. By assigning VM1 121 to NUMA1 160, virtual CPUs (not shown for simplicity) of VM1 121 are preferentially supported by first CPU 161 in NUMA1 160. Memory locality is also preferred, which means host 110 preferentially allocates guest physical memory (not shown for simplicity) to VM1 121 assigned to NUMA1 160 from host physical memory 163 on the same NUMA1 160.

Further in FIG. 1, host 110 includes multiple physical network interface controllers (PNICs) 181-184, which may be grouped into one or multiple NIC teams. As used herein, the term "NIC team" or "team" may refer generally the grouping of multiple physical NICs into one logical NIC, such as for fault tolerance and load balancing purposes. NIC teaming is sometimes referred to as port trunking, link bundling, NIC bonding, link aggregation, etc. Any suitable technology or protocol may be used for NIC teaming, such as Link Aggregation Control Protocol (LACP), Ethernet Channel (EtherChannel), Port Aggregation Protocol (PAgP), etc.

To facilitate fault tolerance, each member of a NIC team is capable of connecting to physical network 102 independently of other members. This way, NIC teaming eliminates a single point of failure for any one physical NIC, thereby improving the fault tolerance of the overall network connection and supporting failover in the event of a hardware failure. To facilitate load balancing, NIC teaming allows the sharing of traffic load among some or all of members of a team. For example in FIG. 1, traffic from VMs 121-124 may be distributed among PNICs 181-184 based on any suitable approach. For example, when configuring virtual switch 116, a user (e.g., network administrator) may configure a load balancing policy (known as a "NIC teaming policy") to determine how traffic is distributed.

Conventionally, when an egress packet from VM1 121 is detected, virtual switch 116 may select any of the PNICs 181-184 to send the egress packet. The selection is generally performed independently from, and without awareness of, the underlying NUMA architecture of host 110. As such, it is possible to select a PNIC that is associated with a different NUMA node compared to NUMA1 160 assigned to VM1 121. For example in FIG. 1, if PNIC3 183 associated with NUMA2 170 is selected, remote memory access to host physical memory 163 on NUMA1 160 will be required. This may result in higher memory access latency and adversely affect performance, which is sub-optimal and especially undesirable for latency-sensitive traffic.

Packet Handling Based on NUMA Configuration

According to examples of the present disclosure, packet handling may be performed based on a multiprocessor architecture configuration to improve performance. In particular, a "multiprocessor-architecture-aware" approach (e.g., "NUMA-aware") may be used to select a PNIC among multiple PNICs 181-184 during packet handling to avoid or reduce the likelihood of remote memory access. Using examples of the present disclosure, memory access latency may be reduced during packet handling compared to conventional approaches that have no awareness of the underlying multiprocessor architecture of host 110. Examples of the present disclosure may be performed by hypervisor 112 of host 110, such as using virtual switch 116 (e.g., using a NIC teaming module) and configuration information 118 (e.g., NUMA configuration information to be explained further using FIG. 4), etc.

Figure 2:
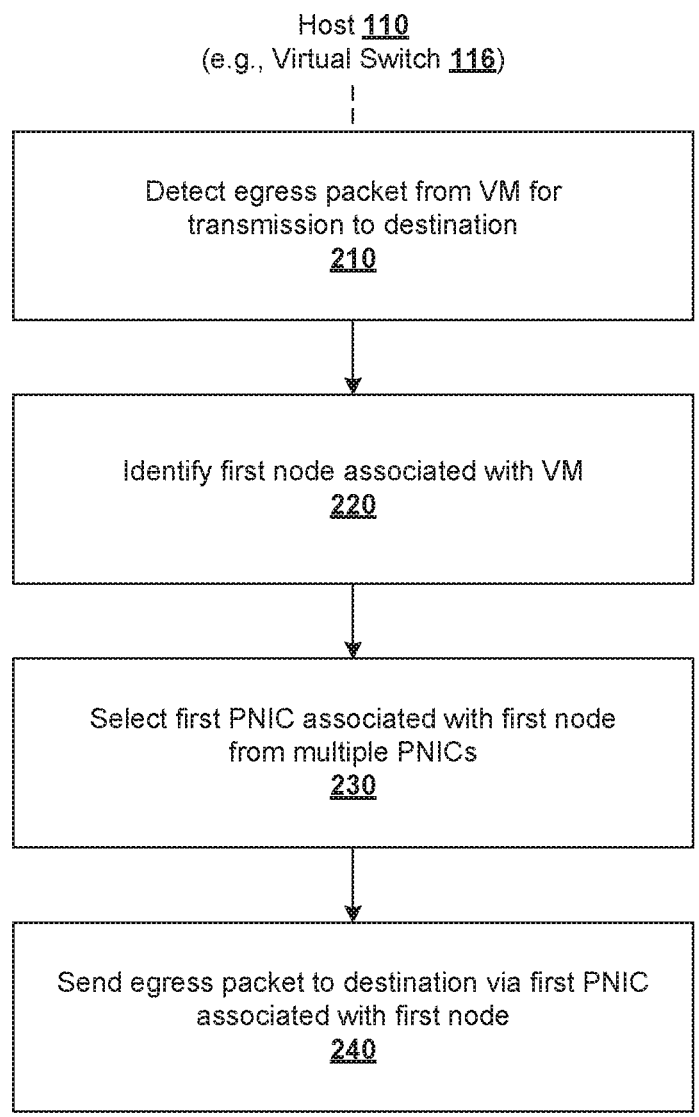
FIG. 2 is a flowchart of an example process for a host to perform packet handling based on a multiprocessor architecture configuration.

In more detail, FIG. 2 is a flowchart of example process 200 for host 110 to perform packet handling based on a multiprocessor architecture configuration. Example process 200 may include one or more operations, functions, or actions illustrated by one or more blocks, such as 210 to 240. The various blocks may be combined into fewer blocks, divided into additional blocks, and/or eliminated depending on the desired implementation. In the following, an example will be explained using VM1 121 as an example "virtualized computing instance"; PNIC1 181 as a "first PNIC"; NUMA1 160 as a "first node" associated with VM1 121 and PNIC1 181; PNIC3 183 or PNIC4 184 as a "second PNIC"; and NUMA2 170 as "second node." Although NUMA will be used as an example "multiprocessor architecture" below, it should be understood that any suitable alternative multiprocessor architecture that includes a "first node" and a "second node" may be used in practice.

At 210 in FIG. 2, host 110 detects an egress packet from VM1 121 supported by host 110 for transmission to a destination via one of multiple PNICs 181-184 of host 110. At 220 and 230, host 110 identifies NUMA1 160 associated with VM1 121; and selects PNIC1 181 associated with NUMA1 160 from multiple PNICs 181-184. At 240, the egress packet is sent to the destination via PNIC1 181 associated with NUMA1 160. This way, the egress packet is sent via a PNIC that is associated with the same NUMA node as VM1 121. See corresponding 191 and 192 in FIG. 1.

As will be discussed using FIG. 3 and FIG. 4, block 230 may involve selecting PNIC1 181 from first team 180 based on any suitable teaming policy. Block 240 may involve accessing host physical memory 163 from which a guest physical memory accessible by VM1 121 is allocated. Host physical memory 163 may be accessed to retrieve the egress packet and/or metadata associated with the egress packet. Since both host physical memory 163 and PNIC1 181 are associated with NUMA1 160, a local memory access may be performed to access host physical memory 163 when sending the egress packet. More detailed examples will be discussed below.

NUMA Configuration

Figure 3:
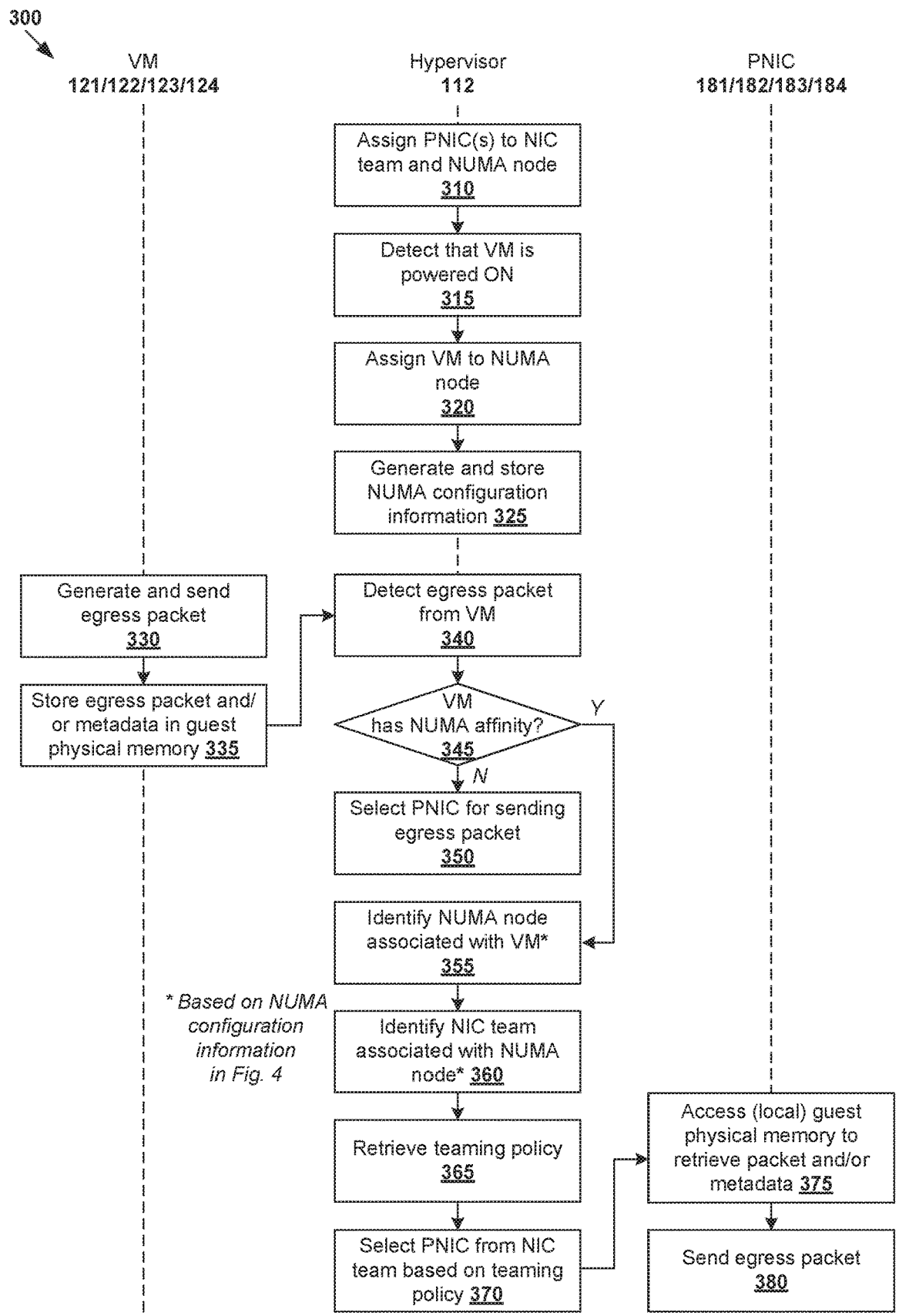
FIG. 3 is a flowchart of an example detailed process for a host to perform packet handling based on NUMA configuration.

FIG. 3 is a flowchart of example detailed process 300 for packet handling based on NUMA configuration in virtualized computing environment 100. Example process 300 may include one or more operations, functions, or actions illustrated by one or more blocks, such as 310 to 380. The various blocks may be combined into fewer blocks, divided into additional blocks, and/or eliminated depending on the desired implementation. It should be understood that it is not necessary to configure NUMA affinity for all virtual machines supported by host 110.

At 310 in FIG. 3, PNICs 181-184 are each assigned to a particular NIC team associated with a particular NUMA node, such as when PNICs 181-184 are attached or connected to virtual switch 116, etc. Depending on the desired implementation, a NIC team may be configured for, and assigned to, each NUMA node of host 110. For example, if there are eight NUMA nodes, eight NIC teams will be configured assigned to the respective NUMA nodes. Each NIC team represents a subset of PNICs 181-184.

In the example in FIG. 1, PNICs 181-182 are configured as first NIC team 180 assigned to NUMA1 160. In this case, host physical memory 163 associated with the same NUMA1 160 is referred to as the "local memory" for PNICs 181-182, while host physical memory 173 associated with different NUMA2 170 is "remote memory." Similarly, PNICs 183-184 are configured as second NIC team 185 assigned to NUMA2 170, and have access to "local" host physical memory 173 associated with the same NUMA2 170 and "remote" host physical memory 163 associated with NUMA1 160. As explained using FIG. 1, remote memory access via NUMA connection 165 is undesirable because it results in a higher latency.

At 315 and 320 in FIG. 3, in response to detecting that a particular VM is powered on and connects to virtual switch 116, the VM is assigned to a particular NUMA node (called home node). In practice, any suitable assignment or placement policy may be used. For example, using a round robin approach, VM1 121 is assigned to NUMA1 160, VM2 122 to NUMA2 170, VM3 123 to NUMA1 160 and VM4 124 to NUMA2 170. In another example, a load-based policy may be used to assign a VM to a particular NUMA node that has the least number of associated VMs. The assignment to a particular NUMA node may be referred to as the NUMA affinity of a particular VM.

Each VM runs on CPU within its home node, and its guest physical memory allocated from a host physical memory of its home node. Since VM1 121 and VM3 123 are assigned to NUMA1 160, they both run on multi-core CPU1 160, and their guest physical memory (not shown for simplicity) allocated from host physical memory 163 on the same NUMA1 160. Similarly, since VM2 122 and VM4 124 are assigned to NUMA2 170, they run on CPU2 171 and their guest physical memory is allocated from host physical memory 173 associated with NUMA2 170.

Further, based on the configuration at 310 in FIG. 3, VM1 121 and VM3 123 may access "local" PNICs 181-182 that are configured as first NIC team 180 and associated with NUMA1 160. Since VM2 122 and VM4 124 are assigned to NUMA2 170, they have access "local" PNICs 183-184 that are configured as second NIC team 185 and associated with NUMA2 170.

At 325 in FIG. 3, host 110 generates and stores NUMA configuration information that associates a particular VM with a particular NUMA node and PNIC(s) configured as a NIC team. An example is shown in FIG. 4, which is a schematic diagram illustrating example NUMA configuration information 118/400 to facilitate packet handling based on NUMA configuration. Depending on the desired implementation, NUMA configuration information 400 (also shown at 118 in FIG. 1) may be stored at a virtual component level (e.g., VNIC, port). For example, a virtual component via which an egress packet is received by virtual switch 116 may be associated with (or mapped to) particular NUMA node 160/170 and NIC team 180/185. Although the example in FIG. 4 specifies both VNIC 141/142/143/144 and logical port 151/152/153/154 associated with VM 121/122/123/124, either one may be specified in an alternative implementation. Any alternative and/or additional virtual component(s) may be used.

Figure 4:
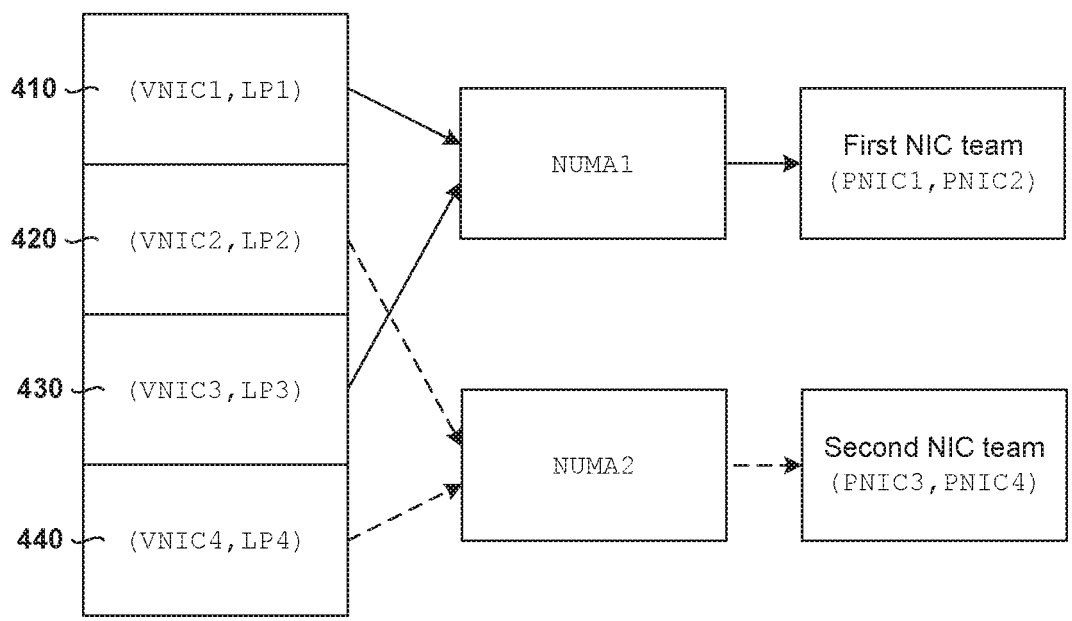
FIG. 4 is a schematic diagram illustrating example NUMA configuration information based on which packet handling is performed according to the example in FIG. 3.

For example, referring to 410 in FIG. 4, VNIC1 141 and/or LP1 151 via which packets from VM1 121 are received by virtual switch 116 may be mapped to first NIC team 180 and NUMA1 160 to which VM1 121 is assigned. At 420, VNIC2 142 and LP2 152 via which packets from VM2 122 are received may be mapped to second NIC team 185 and NUMA2 170. At 430, VNIC3 143 and LP3 153 connected with VM3 123 may be mapped to first NIC team 180 and NUMA1 160. At 440, VNIC4 144 and LP4 154 connected with VM4 124 may be mapped to second NIC team 185 and NUMA2 170.

After the initial placement at block 320, it should be understood that a dynamic rebalancing algorithm may be implemented periodically, such as to determine whether to reassign a VM from one NUMA node to another NUMA node (e.g., less loaded with fewer number of attached VM(s)). For example, if VM2 122 and VM4 124 assigned to NUMA2 170 are powered off, VM3 123 may be moved from NUMA1 160 to NUMA2 170 for load balancing purposes. In this case, NUMA configuration information 400 in FIG. 4 may be updated accordingly to associate VNIC4 144 and LP4 154 connected with VM4 124 with second NIC team 185 instead of first NIC team 180.

Example Packet Handling

According to examples of the present disclosure, packet handling may be performed based on NUMA configuration information 400 in FIG. 4 to improve memory locality and performance. At 330 in FIG. 3, VM1 121 generates and sends an egress packet that is destined for a destination (not shown for simplicity) that is not supported by host 110 and connected with VM1 121 via physical network 102. At 335 in FIG. 3, the egress packet and/or metadata associated with the egress packet are stored in guest physical memory allocated from host physical memory 163, which is associated with NUMA1 160 to which VM1 121 is assigned at block 320.

At 340 and 345 in FIG. 3, in response to detecting the egress packet from VM1 121 via VNIC1 141 and LP1 151, virtual switch 116 determines whether VM1 121 has any NUMA affinity (i.e., assigned to a particular NUMA node). If not, at 350, virtual switch 116 may select any one of PNICs 181-184 to send the egress packet. Block 350 takes into account that not all VMs supported by host 110 have NUMA affinity. For example, a user may manually configure the physical CPU and/or memory affinity for a particular VM, which may not benefit from memory locality optimization. Otherwise (i.e., VM has NUMA affinity), example process 300 proceeds as follows.

At 355 and 360 in FIG. 3, virtual switch 116 identifies NUMA1 160 associated with VM1 121, and first NIC team 180 associated with the same NUMA1 160. For example, this may involve virtual switch 116 identifying that the egress packet is received via VNIC1 41 and LP1 151. Based on NUMA configuration information 410 in FIG. 4, (VNIC1, LP1) is mapped to NUMA1 160 and first NIC team 180.

At 365 and 370, virtual switch 116 retrieves a teaming policy and selects a particular PNIC from first NIC team 180 associated with NUMA1 160 based on the teaming policy. In practice, the teaming policy may be defined based on any suitable criterion or criteria, such as a source IP address in the egress packet, a source MAC address in the egress packet, source port ID (e.g., LP1 151) via which the egress packet is detected, a failover order among PNICs in a team, a round robin policy, resource utilization information associated with each PNIC in the team, etc.

For example, a hash function may be applied to the source IP/MAC address to select between PNIC1 181 and PNIC2 182 on first team NIC 180. Using a failover order, PNIC1 181 configured as an active PNIC may be selected over PNIC2 182 configured as a standby PNIC. Using the resource utilization information, PNIC1 181 may be selected over PNIC2 182 based on a lower load, such as having a lower number of VM(s) attached or bound to PNIC1 181 compared to PNIC2 182. Since the teaming policy is designed to select a PNIC associated with the same NUMA node as VM1 121, the teaming policy may also be referred to as a "NUMA-aware" teaming policy.

At 375 and 380 in FIG. 3, when sending the egress packet, PNIC1 181 selected based on the teaming policy may access host physical memory 163 to retrieve the egress packet and/or associated metadata. Since PNIC1 181 and host physical memory 163 are both associated the same NUMA1 160, PNIC1 181 may perform local memory access. This should be contrasted against conventional approaches that are lack NUMA awareness and select, for example, PNIC3 183 associated with different NUMA2 170 to send packets from VM1 121. Compared to these conventional approaches, examples of the present disclosure may avoid or reduce the likelihood of remote memory access, thereby reducing packet delay and improving performance.

The example in FIG. 3 may be implemented to handle egress packets from other VMs supported by host 110. Some examples will be discussed using FIG. 1 and FIG. 4 below.

(a) In a first example, in response to detecting an egress packet from VM2 122 via VNIC2 142 and LP2 152, virtual switch 116 may identify NUMA2 170 associated with VM2 122 and select PNIC3 183 associated with the same NUMA2 170 to send the egress packet. See corresponding 193-194 in FIG. 1. Using NUMA configuration information 420 in FIG. 4, the selection may be made based on the mapping between (VNIC2, LP2) and NUMA2 170 and second NIC team 185 of which PNIC3 183 is a member.

(b) In another example, in response to detecting an egress packet from VM3 123 via VNIC3 143 and LP3 153, virtual switch 116 may select PNIC2 182 to send the egress packet based on NUMA2 170. See corresponding 195-196 in FIG. 1. Using NUMA configuration information 430 in FIG. 4, the selection may be made based on the mapping between (VNIC3, LP3) and NUMA1 160 and first NIC team 180 of which PNIC2 182 is a member.

(c) In a further example, in response to detecting an egress packet from VM4 124 via VNIC4 144 and LP4 154, virtual switch 116 may select PNIC4 184 to send the egress packet based on NUMA2 170. See corresponding 197-198 in FIG. 1. Using NUMA configuration information 440 in FIG. 4, the selection may be made based on the mapping between (VNIC4, LP4) and NUMA1 160 and first NIC team 180 of which PNIC4 184 is a member.

Container Implementation

Although explained using VMs 121-124, it should be understood that examples of the present disclosure may be implemented to perform packet handling for other virtualized computing instances, such as containers, etc. Some examples will be described using FIG. 5, which is a schematic diagram illustrating example virtualized computing environment 500 with containers 511-514 for which packet handling based on NUMA configuration may be performed.

Figure 5:
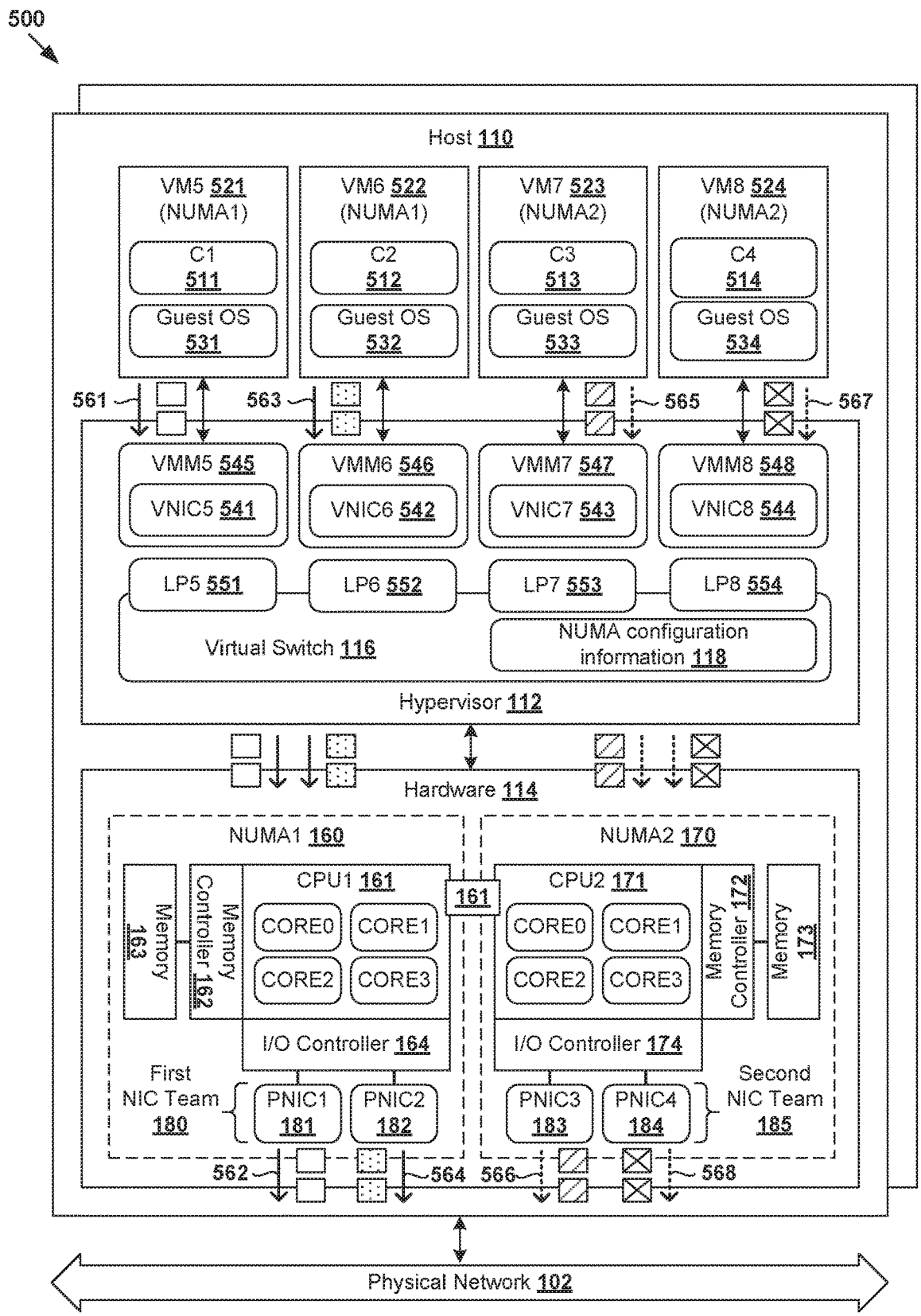
FIG. 5 is a schematic diagram illustrating an example virtualized computing environment with containers for which packet handling based on NUMA configuration may be performed.

In the example in FIG. 5, container technologies may be used to run various containers 511-514 inside respective VMs 521-524. For example, containers C1 511 may be executed as an isolated process supported by guest OS 531 inside VM5 521, C2 512 supported by guest OS 532 inside VM6 522, C3 513 supported by guest OS 533 inside VM7 523, and C4 514 supported by guest OS 534 inside VM8 524. Packets to and from containers 511-514 may be forwarded via respective VNICs 541-544 (emulated by respective VMMs 545-548) and logical ports 551-554.

As used herein, the term "container" (also known as "container instance") is used generally to describe an application that is encapsulated with all its dependencies (e.g., binaries, libraries, etc.). Containers 511-514 are "OS-less", meaning that they do not include any OS that could weigh 10 s of Gigabytes (GB). This makes containers 511-514 more lightweight, portable, efficient and suitable for delivery into an isolated OS environment. Running containers inside a VM (known as "containers-on-virtual-machine" approach) not only leverages the benefits of container technologies but also that of virtualization technologies. It should be understood that each VM may support multiple containers.

Similar to the examples in FIG. 1 to FIG. 4, containers 511-514 may be each assigned to a particular NUMA node, such as C1 511 and C2 512 to NUMA1 160, and C3 513 and C4 514 to NUMA2 170. Based on NUMA configuration information associated with C1 511-514, NUMA-aware packet handling may be performed. In a first example, in response to detecting an egress packet from C1 511 via VNICS 541 and LP5 551, virtual switch 116 may identify that C1 511 is associated with NUMA1 160, and select PNIC1 181 associated with the same NUMA1 160 to send the egress packet. See corresponding 561-562 in FIG. 5.

In a second example, in response to detecting an egress packet from C2 512 via VNIC6 542 and LP6 552, virtual switch 116 may select PNIC2 182 associated with NUMA1 160 to send the egress packet. See corresponding 563-564 in FIG. 5. In third example, in response to detecting an egress packet from C3 513 via VNIC7 543 and LP7 553, virtual switch 116 may select PNIC3 183 associated with NUMA2 170 to send the egress packet. See corresponding 565-566 in FIG. 5. In a fourth example, in response to detecting an egress packet from C4 514 via VNIC8 544 and LP8 554, virtual switch 116 may select PNIC4 184 to send the egress packet. See corresponding 567-568 in FIG. 5. Other examples discussed using FIG. 1 and FIG. 4 may be implemented for containers 511-514 and will not be repeated here for brevity.

Computer System

The above examples can be implemented by hardware (including hardware logic circuitry), software or firmware or a combination thereof. The above examples may be implemented by any suitable computing device, computer system, etc. The computer system may include processor(s), memory unit(s) and PNIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 5. For example, computer systems capable of acting as host 110 may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:
1. A method for a host to perform packet handling based on a multiprocessor architecture configuration that includes a first non-uniform memory access (NUMA) node, a second NUMA node and multiple physical network interface controllers (PNICs), wherein the method comprises:
   assigning, by the host, a first PNIC of the multiple PNICs to a first team associated with the first NUMA node, and a second PNIC of the multiple PNICs to a second team associated with the second NUMA node;
   generating, by the host, configuration information that associates a first virtual component with the first NUMA node and the first team, and a second virtual component with the second NUMA node and the second team;
   detecting, from a virtualized computing instance supported by the host, an egress packet for transmission to a destination via one of the multiple PNICs;
   identifying, by the host, the first NUMA node that the virtualized computing instance is assigned to based on the generated configuration information that associates the first virtual component via which the egress packet is received from the virtualized computing instance with the first NUMA node and the first team, wherein the first NUMA node includes at least a first processor and a first host physical memory, and the second NUMA node includes at least a second processor and a second host physical memory;
   identifying, by the host, the first team based on the identified first NUMA node;
   selecting, from the multiple PNICs by the host, the first PNIC associated with the first NUMA node based on the identified first team; and
   sending, by the host, the egress packet to the destination via the selected first PNIC.

2. The method of claim 1, wherein sending the egress packet comprises:
   retrieving the egress packet or metadata associated with the egress packet by accessing the first host physical memory from which a guest physical memory is allocated, wherein the first host physical memory is local to the first PNIC, and the guest physical memory is accessible by the virtualized computing instance.

3. The method of claim 1, wherein selecting the first PNIC comprises:
   selecting the first PNIC from the first team based on a teaming policy, wherein the first team includes a subset of the multiple PNICs.

4. The method of claim 3, wherein selecting the first PNIC comprises:
   retrieving the teaming policy that is defined based on one or more of the following: a source Internet Protocol (IP) address in the egress packet, a source Media Access Control (MAC) address in the egress packet, a port via which the egress packet is detected, a failover order, a round robin policy, and resource utilization information associated with each PNIC in the first team.

5. The method of claim 1, wherein the method further comprises:
   prior to detecting the egress packet, assigning the virtualized computing instance to the first NUMA node.

6. A non-transitory computer-readable storage medium that includes a set of instructions which, in response to execution by a processor of a host, cause the processor to perform a method of packet handling based on a multiprocessor architecture configuration that includes a first non-uniform memory access (NUMA) node, a second NUMA node and multiple physical network interface controllers (PNICs), the method comprising:
   assigning a first PNIC of the multiple PNICs to a first team associated with the first NUMA node, and a second PNIC of the multiple PNICs to a second team associated with the second NUMA node;
   generating, by the host, configuration information that associates a first virtual component with the first NUMA node and the first team, and a second virtual component with the second NUMA node and the second team;
   detecting, from a virtualized computing instance supported by the host, an egress packet for transmission to a destination via one of the multiple PNICs;
   identifying the first NUMA node that the virtualized computing instance is assigned to based on the generated configuration information that associates the first virtual component via which the egress packet is received from the virtualized computing instance with the first NUMA node and the first team, wherein the first NUMA node includes at least a first processor and a first host physical memory, and the second NUMA node includes at least a second processor and a second host physical memory;
   identifying the first team based on the identified first NUMA node;
   selecting, from the multiple PNICs, the first PNIC associated with the first NUMA node based on the identified first team; and
   sending the egress packet to the destination via the selected first PNIC.

7. The non-transitory computer-readable storage medium of claim 6, wherein sending the egress packet comprises:
   retrieving the egress packet or metadata associated with the egress packet by accessing the first host physical memory from which a guest physical memory is allocated, wherein the first host physical memory is local to the first PNIC, and the guest physical memory is accessible by the virtualized computing instance.

8. The non-transitory computer-readable storage medium of claim 6, wherein selecting the first PNIC comprises:
   selecting the first PNIC from the first team based on a teaming policy, wherein the first team includes a subset of the multiple PNICs.

9. The non-transitory computer-readable storage medium of claim 8, wherein selecting the first PNIC comprises:
   retrieving the teaming policy that is defined based on one or more of the following: a source Internet Protocol (IP) address in the egress packet, a source Media Access Control (MAC) address in the egress packet, a port via which the egress packet is detected, a failover order, a round robin policy, and resource utilization information associated with each PNIC in the first team.

10. The non-transitory computer-readable storage medium of claim 6, wherein the method further comprises:
    prior to detecting the egress packet, assigning the virtualized computing instance to the first NUMA node.

11. A host configured to perform packet handling based on a multiprocessor architecture configuration, the host comprising:
    a processor;
    a first non-uniform memory access (NUMA) node and a second NUMA node of the multiprocessor architecture configuration, wherein the first NUMA node includes at least a first processor and a first host physical memory, and the second NUMA node includes at least a second processor and a second host physical memory;

multiple physical network interface controllers (PNICs) that include a first PNIC and a second PNIC; and a non-transitory computer-readable medium having stored thereon instructions that, when executed by the processor, cause the processor to:

assign the first PNIC to a first team associated with the first NUMA node, and the second PNIC to a second team associated with the second NUMA node;

generate configuration information that associates a first virtual component with the first NUMA node and the first team, and a second virtual component with the second NUMA node and the second team;

detect, from a virtualized computing instance supported by the host, an egress packet for transmission to a destination via one of the multiple PNICs;

identify the first NUMA node that the virtualized computing instance is assigned to based on the generated configuration information that associates the first virtual component via which the egress packet is received from the virtualized computing instance with the first NUMA node and the first team;

identify the first team based on the identified first NUMA node;

select, from the multiple PNICs, the first PNIC associated with the first NUMA node based on the identified first team; and send the egress packet to the destination via the selected first PNIC.

12. The host of claim 11, wherein the instructions for sending the egress packet cause the processor to:

retrieve the egress packet or metadata associated with the egress packet by accessing the first host physical memory from which a guest physical memory is allocated, wherein the first host physical memory is local to the first PNIC, and the guest physical memory is accessible by the virtualized computing instance.

13. The host of claim 11, wherein the instructions for selecting the first PNIC cause the processor to:

select the first PNIC from the first team based on a teaming policy, wherein the first team that includes a subset of the multiple PNICs.

14. The host of claim 13, wherein the instructions for selecting the first PNIC cause the processor to:

retrieve the teaming policy that is defined based on one or more of the following: a source Internet Protocol (IP) address in the egress packet, a source Media Access Control (MAC) address in the egress packet, a port via which the egress packet is detected, a failover order, a round robin policy, and resource utilization information associated with each PNIC in the first team.

15. The host of claim 11, wherein the instructions further cause the processor to:

prior to detecting the egress packet, assign the virtualized computing instance to the first NUMA node.

* * * * *